(No Model.)

E. W. ALLIS.
FENCE.

No. 468,381. Patented Feb. 9, 1892.

ATTEST.
J. Henry Kaiser.
Joseph C. Stack.

INVENTOR.
Elliot W. Allis.

UNITED STATES PATENT OFFICE.

ELLIOT W. ALLIS, OF ADRIAN, MICHIGAN.

FENCE.

SPECIFICATION forming part of Letters Patent No. 468,381, dated February 9, 1892.

Application filed April 16, 1891. Serial No. 389,134. (No model.)

*To all whom it may concern:*

Be it known that I, ELLIOT W. ALLIS, a citizen of the United States, residing at Adrian, in the county of Lenawee and State of Michigan, have invented certain new and useful Improvements in Fences; and I do declare the following to be a full, clear, and exact description of the invention, such as will enable others skilled in the art to which it appertains to construct the same, due reference being had to the accompanying drawings, which form a part of this specification.

Figure 1:
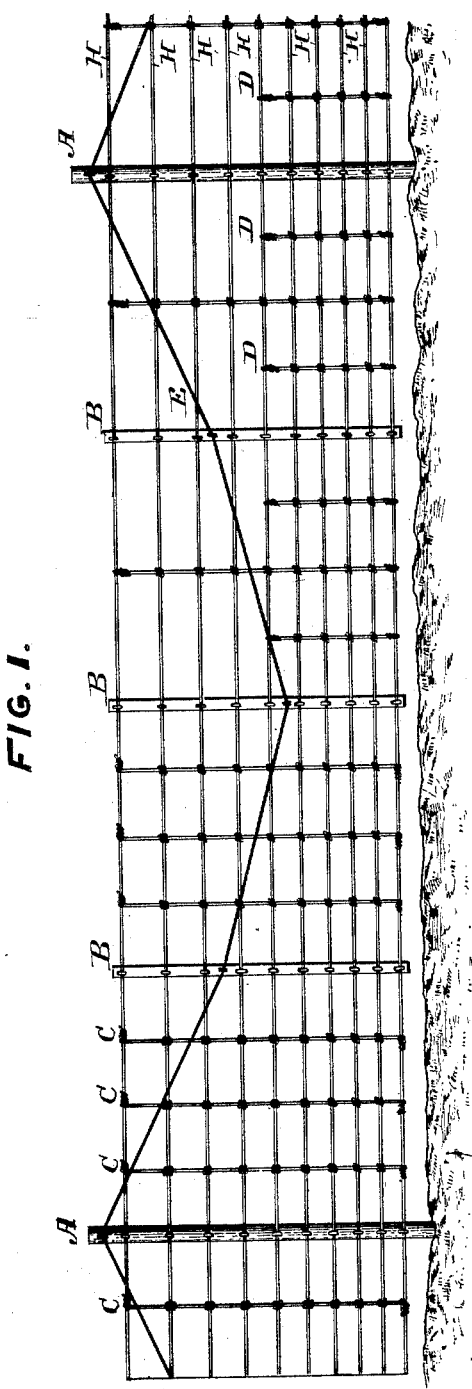
Figure 2:
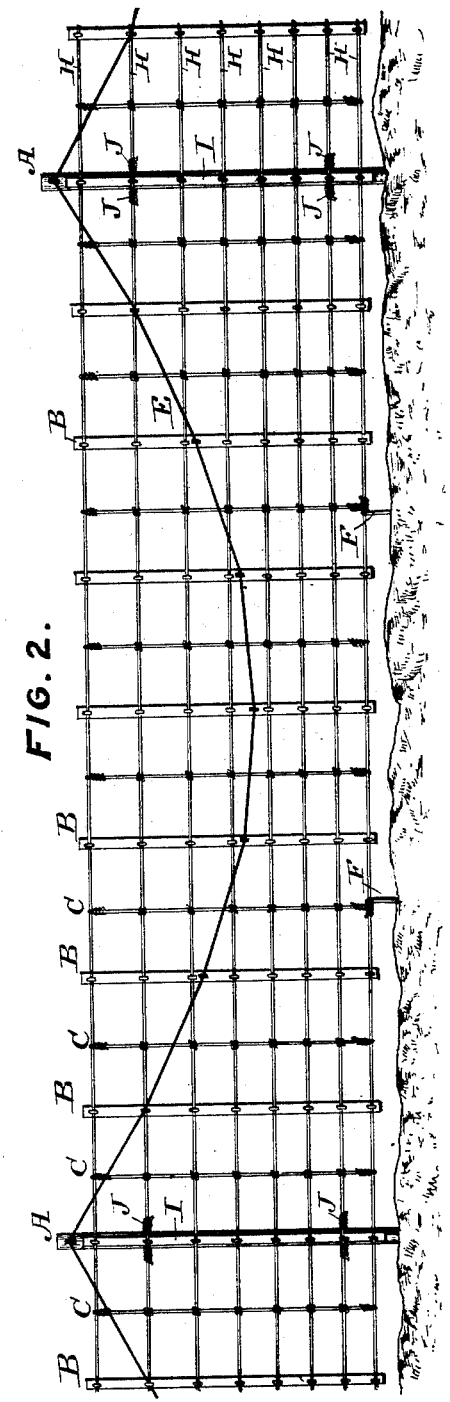

Figures 1 and 2 are front elevations of my fence, the latter being a slight modification of the former.

This invention has relation to combination woven-wire and picket fences; and it consists in the novel construction and combination of parts, as hereinafter set forth.

The object of my invention is to so construct a fence that it shall combine with the strength and lightness of a woven-wire fence occasional upright pickets that shall serve to stiffen said fence and render it more firm and rigid and also render its presence more conspicuous, and also to provide a diagonal or brace wire occasionally fastened to the fence, whose office it shall be at short intervals to remove the strain occasioned by the weight of picket and wire from the horizontal wires and to suspend the weight of the same from the posts.

In the annexed drawings, A represents a post, B a picket, C and D cross-wires, post, picket, and cross-wires being each in some manner (many of which are known to all builders of wire fences) securely fastened to the horizontal wires at their junctions.

E is the suspensory-wire and is securely fastened at each post at or toward its top and is somewhat longer than the horizontal wires, so that it may be brought as low as its length will permit and frequently fastened to the fence between the posts, beginning at the middle and working both ways toward the posts. At each succeeding juncture suspensory-wire is lightly borne upon and fence slightly raised before fastening, substantially as shown in Figs. 1 and 2, and at all such places is made to support the weight of the fence. Where pigs approach the fence, it is sometimes preferable to introduce short wires, as at D in Fig. 1.

In Fig. 2, F represents ground or anchor wires, that are firmly secured to the fence at one end and at the other secured to wood, stone, or other material below the ground to prevent hogs or other animals from springing the fence upward while attempting to make their way beneath it. H represents the horizontal wires so bound together by cross-wires and pickets and borne by the suspensory-wires as to make a firm and solid fence that cannot sag, substantially as above shown and set forth.

I in Fig. 2 represents a picket firmly secured to the fence as at other places and so placed as to come directly in front of the post, enabling the fence to be readily secured to the post, as at J in the same figure, and again to be easily removed when a portable fence is desired.

This fence, as above described and set forth, may be constructed in the field and may be stapled or secured to the posts, thus making a permanent fence; or a picket may be placed at the posts and firmly secured to the fence, as at other places, as represented in Fig. 2, and the fence be firmly secured to the posts in any desirable manner, so that at any time it may be taken down and again put up, thus being made to answer equally well for a permanent or portable fence.

The especial advantages possessed by this construction and combination of fence are strength, rigidity, durability, efficiency, and cheapness of cost.

I am aware that woven wires have been previously used in fence construction. The same may be said of suspensory-wires, of pickets, and of anchors.

Having thus described my invention, what I claim as new, and desire to secure by Letters Patent, is—

1. In a fence, the combination of longitudinal wires, vertical wires, pickets, and a suspensory-wire, the vertical wires being woven upon and the pickets secured to the longitudinal wires, and the suspensory wire being constructed and fastened to the pickets in such manner that the fence can be suspended upon posts and will be held in suspension by its contact with the suspensory-wire at different points between the posts, substantially as described.

2. In a fence, the combination of longitudinal wires, vertical wires, pickets, a suspensory-wire, and anchors, the said vertical wire being woven upon and the pickets secured to the longitudinal wires and the anchors securing the fence to the ground, substantially as described.

3. In a fence, the combination of longitudinal wires, long and short vertical wires, pickets, and a suspensory-wire, the long and short vertical wires being woven upon and the pickets secured to the longitudinal wires and the short vertical wires extending up from the bottom of the fence to a less height than the long ones and occupying places between the pickets and the long vertical wires, substantially as described.

4. In a fence, the combination of longitudinal wires, vertical wires, pickets, and a suspensory-wire, the vertical wires being woven upon and the pickets secured to the longitudinal wires, so that a portion of them occupy positions opposite the posts to which the fence is fastened, and thus serve as the means whereby the fence is fastened to the posts and rendered portable and at the same time can be suspended by the suspensory-wire, substantially as described.

5. In a fence, the combination of longitudinal wires, vertical wires, and pickets, the vertical wires being woven upon and the pickets secured to the longitudinal wires, and a portion of the pickets being suspended between the posts and others occupying positions opposite to the posts to which the fence is fastened, substantially as described.

In testimony whereof I affix my signature in presence of two witnesses.

ELLIOT W. ALLIS.

Witnesses:
G. W. BOCOBEER,
W. A. PECK.